(12) United States Patent
Patel et al.

(10) Patent No.: US 10,864,792 B2
(45) Date of Patent: Dec. 15, 2020

(54) RIDE-HEIGHT ADJUSTMENT WITH LEAF SPRING

(71) Applicant: Ford Global Technologies, LLC, Dearborn, MI (US)

(72) Inventors: Rinku Patel, Kalamazoo, MI (US); Salvador Padilla, Canton, MI (US); Jared Shroyer, Dearborn, MI (US); Eric Schaus, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 98 days.

(21) Appl. No.: 16/239,794

(22) Filed: Jan. 4, 2019

(65) Prior Publication Data

US 2019/0359022 A1 Nov. 28, 2019

Related U.S. Application Data

(60) Provisional application No. 62/675,211, filed on May 23, 2018.

(51) Int. Cl.
*B60G 11/10* (2006.01)
*B60G 11/34* (2006.01)
*B60G 11/113* (2006.01)

(52) U.S. Cl.
CPC .......... *B60G 11/10* (2013.01); *B60G 11/113* (2013.01); *B60G 11/34* (2013.01); *B60G 2204/121* (2013.01); *B60G 2400/252* (2013.01)

(58) Field of Classification Search
CPC .... B60G 17/016; B60G 13/005; B60G 11/34; B60G 11/10; B60G 11/113; B60G 2400/252; B60G 2204/121; B60G 2500/30; B60G 17/023

USPC .................................................. 280/124.17
See application file for complete search history.

(56) References Cited

U.S. PATENT DOCUMENTS

| | | | | |
|---|---|---|---|---|
| 4,504,079 A * | 3/1985 | Strong | ............... | B60G 5/04 105/164 |
| 5,032,821 A * | 7/1991 | Domanico | ......... | B60G 17/0185 180/197 |
| 5,499,845 A * | 3/1996 | Geiger | .............. | B60G 17/0155 280/124.157 |
| 5,566,928 A * | 10/1996 | Lee | .......................... | B60G 9/02 267/31 |
| 5,662,357 A * | 9/1997 | Ryu | .................. | B60G 17/0155 280/6.159 |
| 6,378,878 B1 * | 4/2002 | Vig | ....................... | B60G 11/46 280/5.5 |
| 7,806,391 B2 * | 10/2010 | Leonard | ................ | B60G 11/28 267/122 |
| 8,720,923 B2 | 5/2014 | Ryshavy et al. | | |
| 9,108,483 B2 * | 8/2015 | Preijert | ................. | F16F 3/023 |

(Continued)

FOREIGN PATENT DOCUMENTS

DE 10144111 A1 3/2003
JP 5726567 B2 6/2015

*Primary Examiner* — James A English
*Assistant Examiner* — Kurtis Nielson
(74) *Attorney, Agent, or Firm* — Raymond L. Coppiellie; Bejin Bieneman PLC

(57) ABSTRACT

A suspension system includes a leaf spring, an actuator attached to the leaf spring, and an axle mount attached to the actuator. The actuator is disposed vertically between the leaf spring and the axle mount and is actuatable to change a distance between the leaf spring and the axle mount.

20 Claims, 6 Drawing Sheets

(56) References Cited

U.S. PATENT DOCUMENTS

| | | | |
|---|---|---|---|
| 2003/0034643 A1* | 2/2003 | Stanley | B62D 21/02 |
| | | | 280/788 |
| 2007/0187919 A1 | 8/2007 | Furman | |
| 2015/0210135 A1* | 7/2015 | Mater, Jr. | B60G 11/02 |
| | | | 248/201 |
| 2016/0031287 A1* | 2/2016 | Guest | B60G 17/0165 |
| | | | 701/37 |
| 2016/0152106 A1* | 6/2016 | Preijert | B60G 11/04 |
| | | | 280/124.116 |
| 2016/0339823 A1 | 11/2016 | Smith et al. | |
| 2017/0203626 A1* | 7/2017 | Guest | B60G 17/017 |
| 2017/0314298 A1* | 11/2017 | Tomaszewski | E05B 81/06 |
| 2018/0229567 A1* | 8/2018 | Keeler | B60G 11/465 |
| 2019/0009628 A1* | 1/2019 | Oh | F16F 1/30 |

* cited by examiner

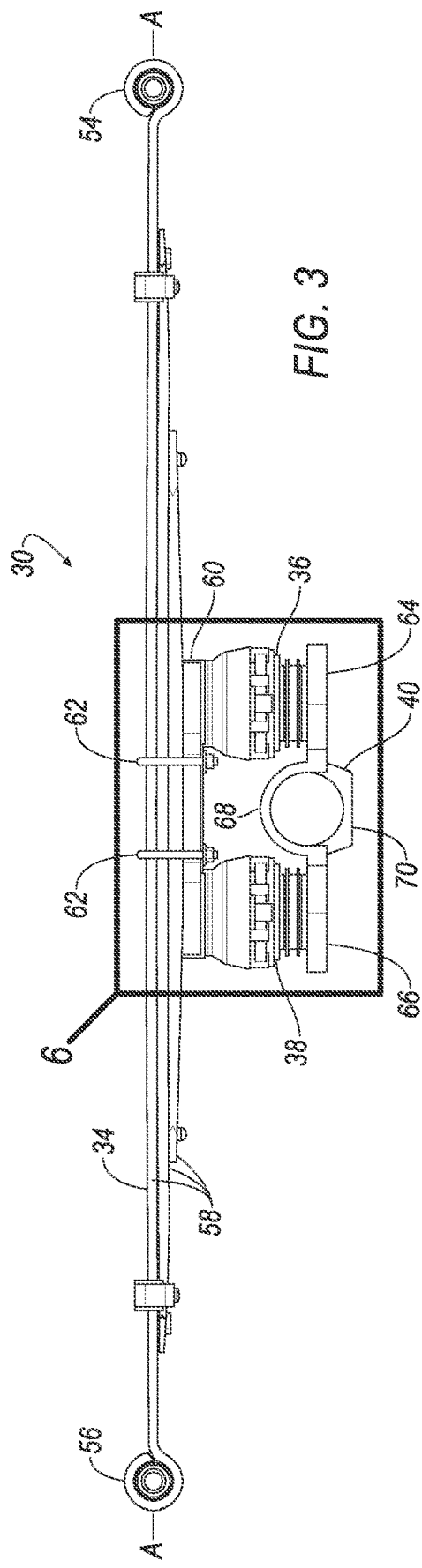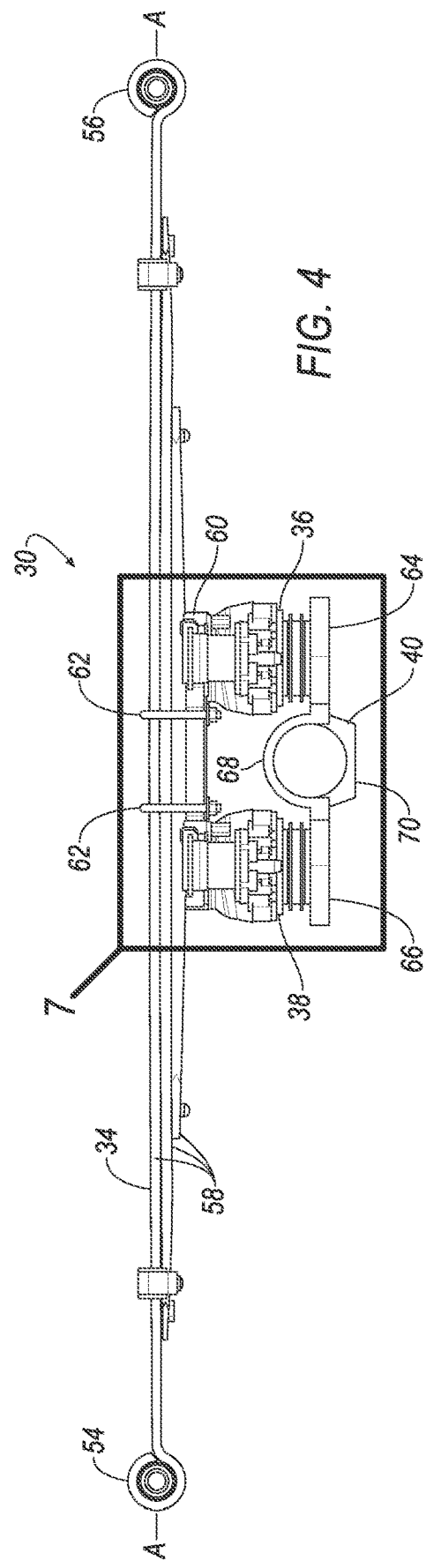

RIDE-HEIGHT ADJUSTMENT WITH LEAF SPRING

CROSS-REFERENCE TO RELATED APPLICATIONS

The subject patent application claims priority to and all the benefits of U.S. Provisional Patent Application No. 62/675,211, which was filed on May 23, 2018 and which is herein incorporated by reference in its entirety.

BACKGROUND

Vehicles typically include suspension systems. The suspension system of a vehicle is coupled to the vehicle frame and to at least one wheel of the vehicle. The suspension system absorbs and dampens shocks and vibrations from the wheels to the vehicle frame. One type of suspension system is a leaf suspension system. The leaf suspension system includes a leaf spring elongated along a longitudinal axis of the vehicle. The leaf spring includes ends attached to the vehicle frame, and an axle of the vehicle is supported by the leaf spring between the ends of the leaf spring. The suspension system is typically arranged so that an upward motion of the wheel, such as when the wheel hits a bump while the vehicle is in motion, loads the leaf spring.

BRIEF DESCRIPTION OF THE DRAWINGS

FIG. 3 is an inboard view of the suspension system of the vehicle of FIG. 1.

FIG. 4 is an outboard view of the suspension system of FIG. 2.

DETAILED DESCRIPTION

Figure 1:
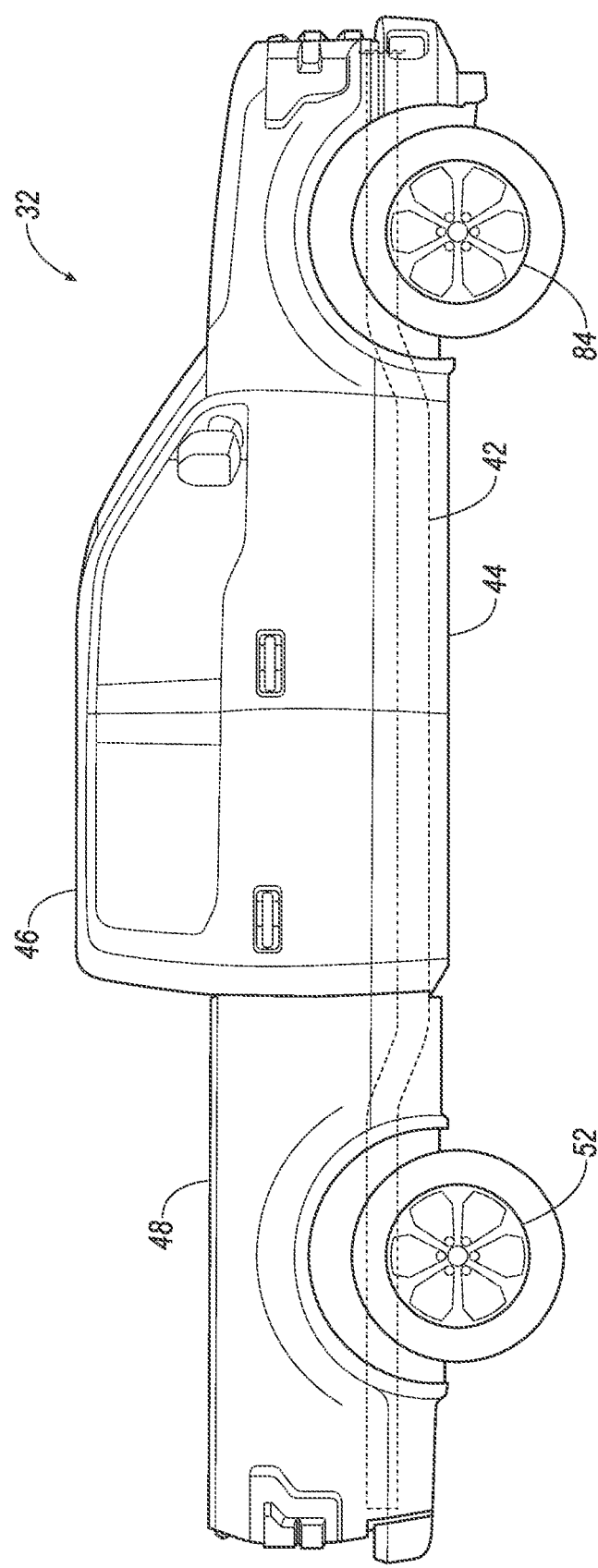
FIG. 1 is a side view of an example vehicle.

A suspension system includes a leaf spring, an actuator attached to the leaf spring, and an axle mount attached to the actuator. The actuator is disposed vertically between the leaf spring and the axle mount and is actuatable to change a distance between the leaf spring and the axle mount.

The suspension system may further include a top plate disposed between the leaf spring and the actuator. The top plate may be directly attached to the leaf spring and to the actuator.

The suspension system may further include a U-bolt holding the top plate and the leaf spring together.

The actuator may be a first actuator, and the suspension system may further include a second actuator disposed vertically between the leaf spring and the axle mount. The first actuator and the second actuator may be oriented to actuate parallel to each other.

The suspension system may further include a first bottom plate directly attached to the first actuator and to the axle mount, and a second bottom plate directly connected to the second actuator and the axle mount. The axle mount may include a top axle-mount section and a bottom axle-mount section, and the first and second bottom plates may be directly attached to the top axle-mount section. The first and second bottom plates and the top axle-mount section may be integral.

The first bottom plate and the second bottom plate may be horizontally aligned.

The axle mount may be between the first actuator and the second actuator.

The actuator may be a linear actuator. The actuator may be oriented to actuate vertically.

The actuator may be electronically actuatable. The suspension system may further include a ride-height sensor coupled to the axle mount, and an electronic control unit communicatively coupled to the actuator and the ride-height sensor, and the electronic control unit may be programmed to actuate the actuator based on data from the ride-height sensor. The electronic control unit may be programmed to lengthen the actuator in response to data from the ride-height sensor indicating a decrease in ride height, and to shorten the actuator in response to data from the ride-height sensor indicating an increase in ride height.

The suspension system may further include an electronic control unit communicatively coupled to the actuator, and the electronic control unit may be programmed to shorten the actuator in response to an ignition switching to off.

The suspension system may further include an electronic control unit communicatively coupled to the actuator, and the electronic control unit may be programmed to shorten the actuator in response to a proximity of a key fob to a vehicle including the suspension system.

The leaf spring may be elongated along an axis, and the actuator may be closer to a center of the leaf spring than to either end of the leaf spring along the axis.

A suspension system 30 for a vehicle 32 includes a leaf spring 34, at least one actuator 36, 38 attached to the leaf spring 34, and an axle mount 40 attached to the actuator 36, 38. The actuator 36, 38 is disposed vertically between the leaf spring 34 and the axle mount 40 and is actuatable to change a distance between the leaf spring 34 and the axle mount 40.

The suspension system 30 provides a useful way to adjust a ride height of the vehicle 32 at the suspension system 30. The suspension system 30 permits the vehicle 32 to be lower for easier ingress and egress. The suspension system 30 can counterbalance light or heavy loading of the vehicle 32, allowing for a similarly level ride regardless. The suspension system 30 can allow the vehicle 32 to be designed with less rake, i.e., a rear ride height greater than a front ride height. The suspension system 30 fits in a compact package space.

With reference to FIG. 1, the vehicle 32 may be any suitable type of vehicle, e.g., a car, pickup truck, van, sport utility vehicle, etc. As examples, the vehicle 32 be a cargo-carrying vehicle, e.g., a pickup truck (as shown in FIG. 1), a van, a sport utility vehicle, etc. The vehicle 32 may be of a body-on-frame construction, in which a frame 42 supports a body 44 that is a separate component from the frame 42. In the example in which the vehicle 32 is a pickup truck, the body 44 may include a cab 46 and a bed 48. As another example, the vehicle 32 may be of a unibody construction, in which the frame 42 and the body 44 of the vehicle 32 are a single component. The frame 42 and body 44 may be formed of any suitable material, for example, steel, aluminum, etc.

With reference to FIGS. 2-7, the vehicle 32 includes an axle 50. The axle 50 includes a housing (not numbered) and houses shafts (not numbered) extending from the housing to rear wheels 52 to transfer rotation to the rear wheels 52. The axle 50 may be a solid axle, i.e., the housing and the shaft are rotatable together as a unit about an axis perpendicular to a longitudinal axis of the vehicle 32.

The suspension system 30 is coupled to the axle 50. The suspension system 30 is coupled to the frame 42. The suspension system 30 absorbs and dampens shocks and vibrations from the rear wheels 52 to the frame 42. The suspension system 30 may be a rear suspension system, as shown in the Figures. In such an example, the axle 50 is a rear axle. As another example, the suspension system 30 may be a front suspension system for front wheels 84. As set forth below, the suspension system 30 may include one or more actuators 36, 38, e.g., a first actuator 36 and a second actuator 38. (The adjectives "first" and "second" are used throughout this document as identifiers and are not intended to signify importance or order.)

Figure 2:
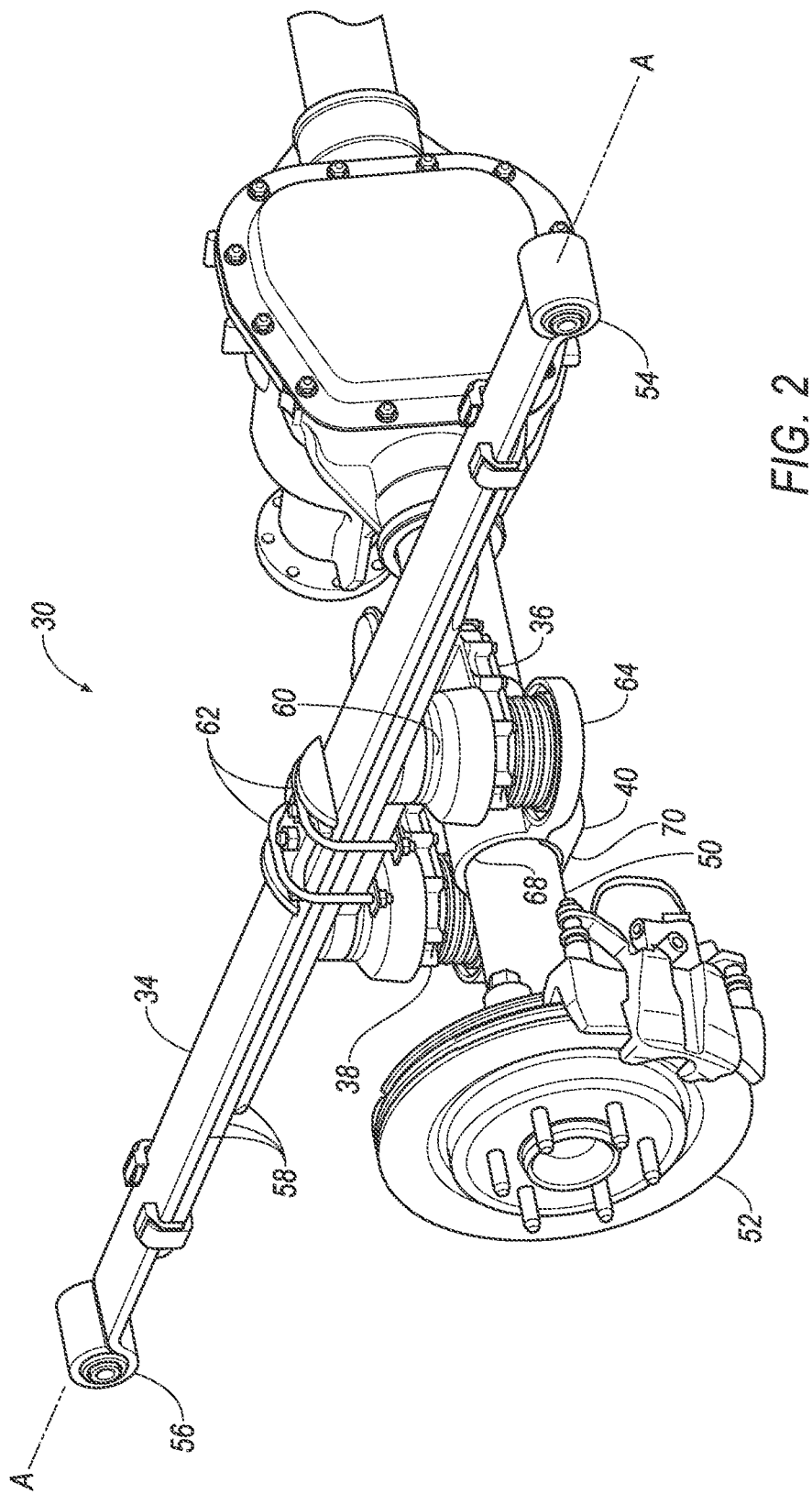
FIG. 2 is a perspective view of a wheel system and suspension system of the vehicle of FIG. 1.
Figure 5:
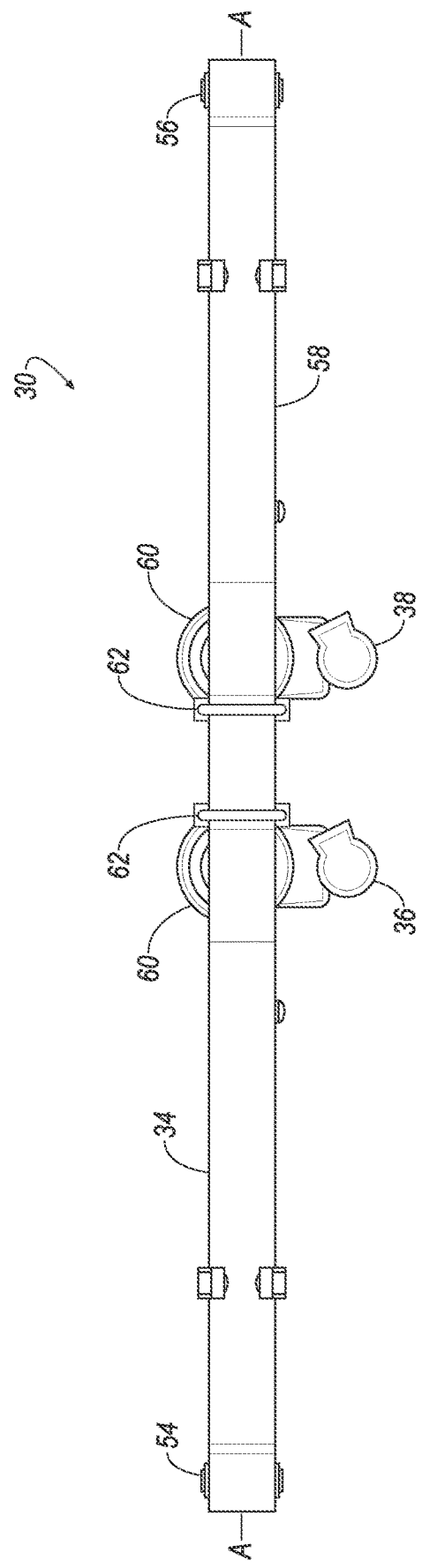
FIG. 5 is a top view of the suspensions system of FIG. 2.
Figure 6:
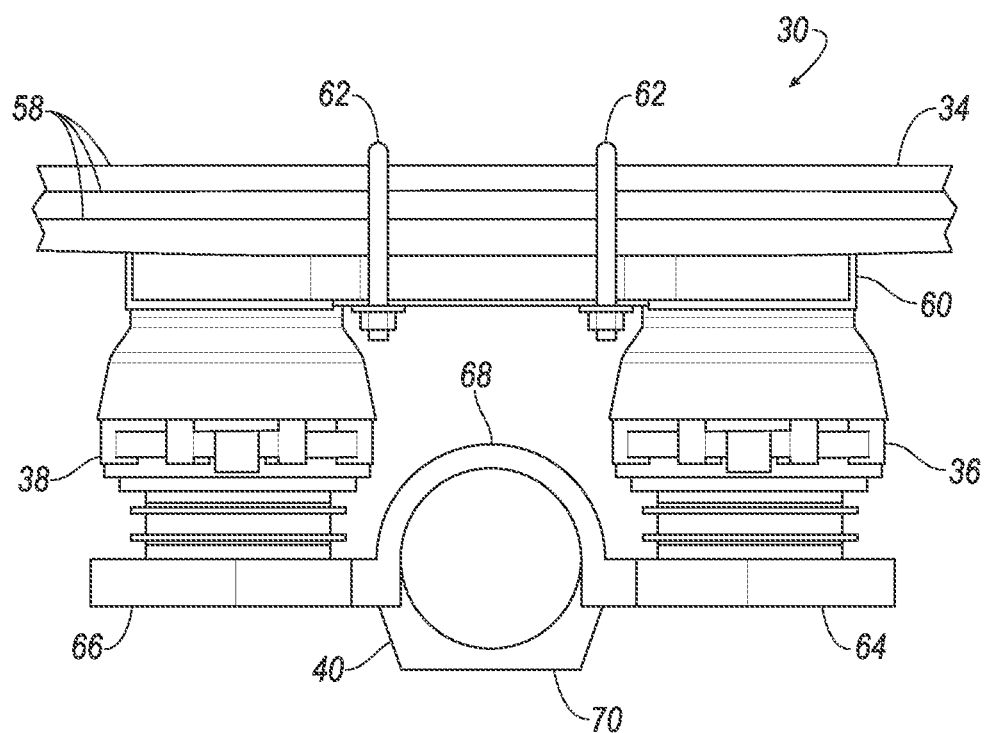
FIG. 6 is an inboard view of a portion of the suspension system of FIG. 2.
Figure 7:
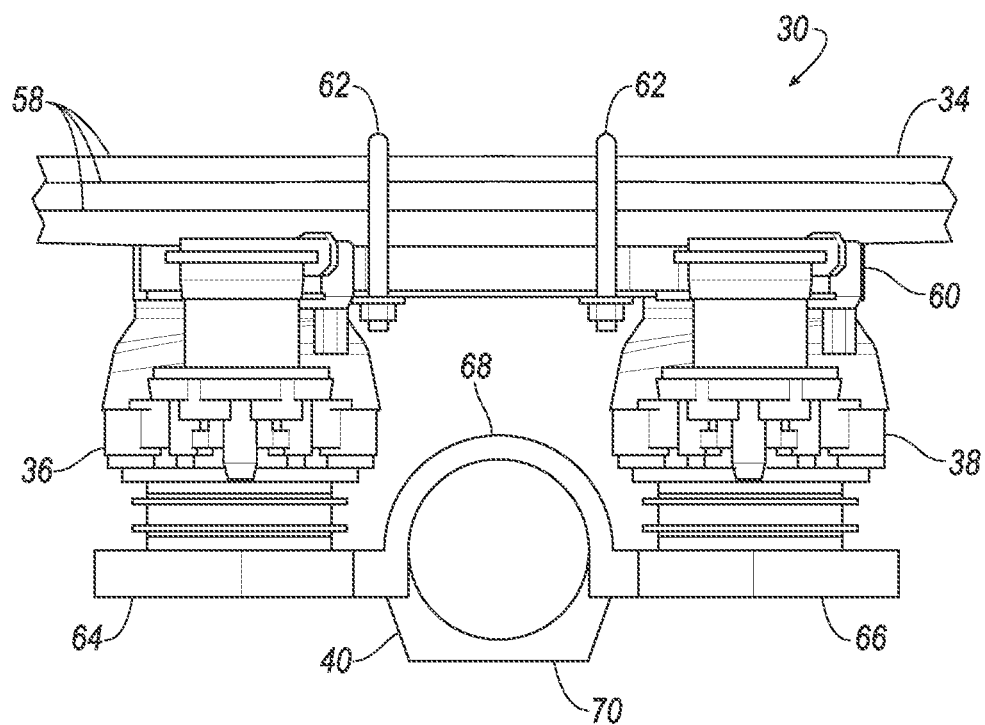
FIG. 7 is an outboard view of a portion of the suspension system of FIG. 2.

The leaf spring 34 is elongated from a first end 54 to a second end 56 along an axis A. The axis A may be oriented in a vehicle-forward direction, i.e., may be a longitudinal axis of the vehicle 32. The leaf spring 34 may be straight or slightly bowed along the axis A. The ends 54, 56 are coupled to the frame 42. Both ends 54, 56 may be fixed to the frame 42, as shown in FIG. 2, or the first end 54 may be fixed to the frame 42 and the second end 56 may be movably attached to the frame 42, such as via a shackle (not shown). The leaf spring 34 includes a plurality of plates 58 elongated between the ends 54, 56. The plates 58 are stacked transverse to the axis A, e.g., stacked vertically. The springiness of the leaf spring 34 comes from the bending of the plates 58.

As set forth above, the suspension system 30 may include one or more actuators 36, 38, e.g., the first actuator 36 and the second actuator 38 in the example shown in the Figures. In the example including the first actuator 36 and the second actuator 38, the axle mount 40 may be between the first actuator 36 and the second actuator 38. The first actuator 36 may be disposed forward of a center of the leaf spring 34 along the axis A, and the second actuator 38 may be disposed rearward of the center of the leaf spring 34 along the axis A. The actuators 36, 38 may be disposed closer to the center of the leaf spring 34 than to either of the ends 54, 56 of the leaf spring 34 along the axis A.

In the example including the first actuator 36 and the second actuator 38, the actuators 36, 38 are oriented to actuate vertically and parallel to each other. The actuators 36, 38 can thus actuate together to lift or lower the leaf spring 34 and the frame 42 relative to the axle mount 40 and the ground, changing the ride height of the rear of the vehicle 32.

Each actuator 36, 38 may be a linear actuator that is actuatable to change a distance between the leaf spring 34 and the axle mount 40. The actuators 36, 38 are actuatable in two directions, i.e., each actuator 36, 38 is actuatable both to lengthen and to shorten the distance between the leaf spring 34 and the axle mount 40. For example, the actuator 36, 38 may be a reciprocating ball screw.

The actuator 36, 38, e.g., both the first actuator 36 and the second actuator 38, is disposed vertically between the leaf spring 34 and the axle mount 40; in other words, the leaf spring 34 is above the actuator 36, 38, and the axle mount 40 is below the actuator 36, 38. The actuator 36, 38 may be disposed directly between the leaf spring 34 and the axle mount 40; i.e., the leaf spring 34 and the axle mount 40 are collinear with each actuator 36, 38.

Each actuator 36, 38 is attached to the leaf spring 34 and to the axle mount 40. Each actuator 36, 38 may be attached indirectly to the leaf spring 34 via a top plate 60. Each actuator 36, 38 may be attached indirectly to the axle mount 40 via one or more bottom plates 64, 66. Each actuator 36, 38 may be attached to one of the bottom plates 64, 66 by, e.g., fasteners, welding, adhesives, etc. For example, the first actuator 36 and the second actuator 38 may be attached to the bottom plates 64, 66, respectively.

The suspension system 30 may include the top plate 60 disposed between the leaf spring 34 and the actuator 36, 38, e.g., both the first actuator 36 and the second actuator 38. The top plate 60 may be adjacent to and contacting the leaf spring 34 and the actuator 36, 38, e.g., both the first actuator 36 and the second actuator 38. The top plate 60 may be elongated along the axis A. The top plate 60 may be shaped to accommodate the actuator 36, 38, e.g., both the first actuator 36 and the second actuator 38. The top plate 60 may have a width approximately equal to a width of the leaf spring 34.

The top plate 60 may be directly attached, i.e., attached with no intervening components other than a fastener, to the leaf spring 34 and to the actuator 36, 38, e.g., both the first actuator 36 and the second actuator 38. For example, two U-bolts 62 may hold the top plate 60 and the leaf spring 34 together by compressing the top plate 60 to the leaf spring 34 vertically. The actuator 36, 38, e.g., both the first actuator 36 and the second actuator 38, may be attached to the top plate 60 by, e.g., fasteners, welding, adhesives, etc.

The bottom plates 64, 66 may be shaped to accommodate the actuators 36, 38. In the example including the first actuator 36 and the second actuator 38, the bottom plates 64, 66 may include the first bottom plate 64 and the second bottom plate 66. The first bottom plate 64 may be directly attached to the first actuator 36 and to the axle mount 40, and the second bottom plate 66 may be directly attached to the second actuator 38 and the axle mount 40. The first bottom plate 64 and the second bottom plate 66 are horizontally aligned with each other, i.e., disposed at the same height as each other.

The axle mount 40 may include a top axle-mount section 68 and a bottom axle-mount section 70. The top axle-mount section 68 and the bottom axle-mount section 70 may be shaped to together rotatably hold the axle 50. The first and second bottom plates 64, 66 may be integral with one of the top axle-mount section 68 and the bottom axle-mount section 70. As shown in the Figures, the first and second bottom plates 64, 66 are integral with the top axle-mount section 68.

Figure 8:
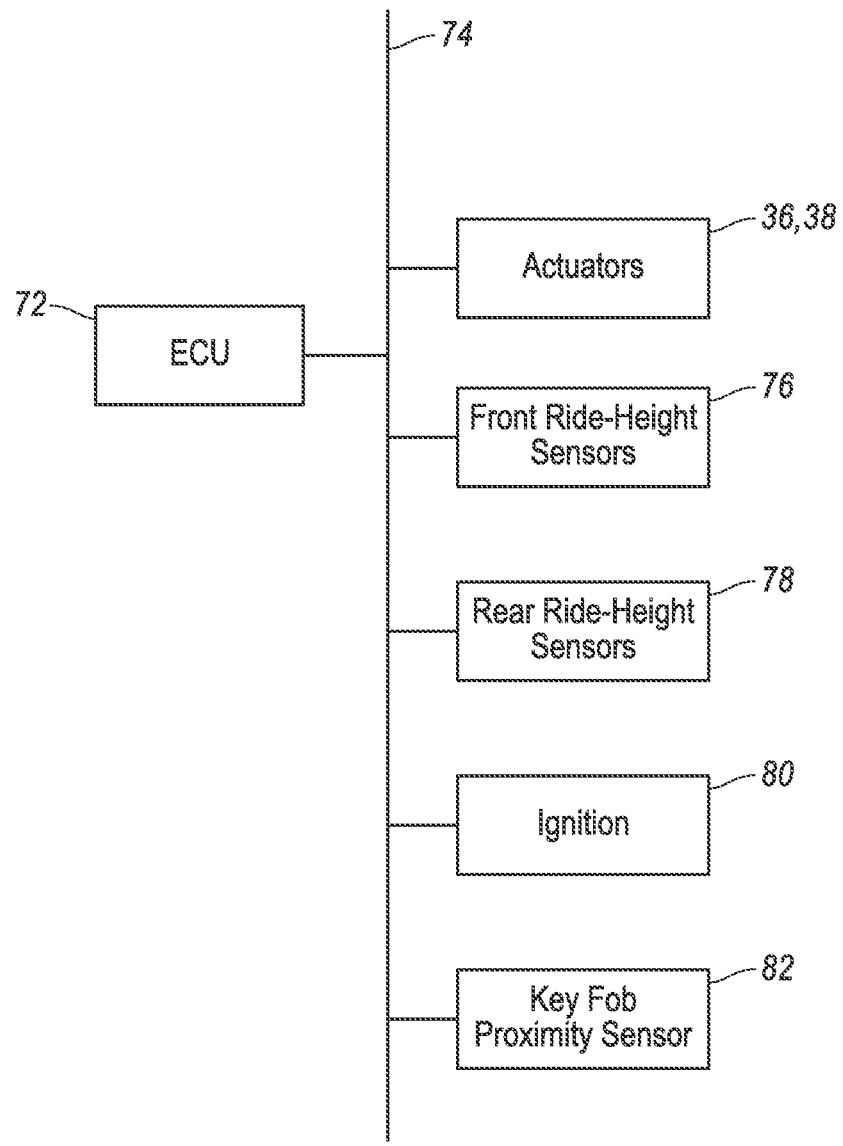
FIG. 8 is a block diagram of a control system for the suspension system of FIG. 2.

With reference to FIG. 8, the vehicle 32 includes an electronic control unit (ECU) 72. The ECU 72 is a microprocessor-based controller. The ECU 72 includes a processor, memory, etc. The memory of the ECU 72 includes memory for storing instructions executable by the processor as well as for electronically storing data and/or databases.

The ECU 72 may transmit and receive data through a communications network 74 such as a controller area network (CAN) bus, Ethernet, WiFi, Local Interconnect Network (LIN), onboard diagnostics connector (OBD-II), and/or by any other wired or wireless communications network. The ECU 72 may be communicatively coupled to the actuator 36, 38 (e.g., both the first actuator 36 and the second actuator 38), front ride-height sensors 76, rear ride-height sensors 78, an ignition 80, a key-fob proximity sensor 82, and other components via the communications network 74.

The ride-height sensors 76, 78 are positioned to detect a relative position of the frame 42 and one of the rear wheels 52 or front wheels 84. The front ride-height sensors 76 are coupled to the frame 42 and to the front wheels 84 of the vehicle 32, and the rear ride-height sensors 78 are coupled to the frame 42 and to the rear wheels 52. The ride-height sensors 76, 78 may have one end fixed relative to the frame 42 and the other end fixed relative to the front or rear wheels 52, 84, e.g., by being fixedly coupled directly or indirectly to the axle mount 40. The ride-height sensors 76, 78 may be any suitable sensors for detecting the relative position of the frame 42 and the front or rear wheels 52, 84, e.g., a rotatable arm and a detector detecting the degree of rotation such as a rotary encoder, a potentiometer etc.; a rod slidable in a cylinder and a detector detecting the position of the rod in the cylinder such as via capacitance, electrical resistance, a linear encoder, etc.; or any other suitable sensor type.

The ECU 72 is programmed to actuate the actuator 36, 38 (e.g., both the first actuator 36 and the second actuator 38), i.e., to lengthen or shorten the actuator 36, 38. For example, the ECU 72 may be programmed to actuate the actuator 36, 38 based on an input from an operator of the vehicle 32. The ECU 72 may actuate the actuators 36, 38 identically, i.e., may actuate the first actuator 36 and the second actuator 38 to move simultaneously and by identical distances.

The input may be provided via a button, switch, etc., in a passenger cabin of the vehicle 32 or via a command from a portable electronic device in communication with the ECU 72 such as a key-fob or a mobile phone.

Alternatively or additionally, the ECU 72 may be programmed to actuate the actuator 36, 38 based on data from the ride-height sensors 76, 78. For example, the ECU 72 may be programmed to lengthen the actuator 36, 38 in response to data from the rear ride-height sensors 78 indicating a decrease in ride height, and to shorten the actuator 36, 38 in response to data from the rear ride-height sensors 78 indicating an increase in ride height. The magnitude of actuation may be based on the magnitude of change in ride height. In other words, the ECU 72 may be programmed to actuate the actuator 36, 38 to counteract a change in ride height, e.g., from loading or unloading the bed 48 of the vehicle 32.

Alternatively or additionally, the ECU 72 may be programmed to shorten the actuator 36, 38 in response to the ignition 80 switching off. The suspension system 30 may thus bring the cab 46 closer to the ground when an occupant is likely to be exiting the cab 46 soon. The ECU 72 may be programmed to adjust the actuator 36, 38 to a first preset height, e.g., to a minimum height. The ECU 72 may be programmed to lengthen the actuator 36, 38 upon, e.g., starting the vehicle 32, i.e., switching the ignition 80 on. The ECU 72 may be programmed to adjust the actuator 36, 38 to a second preset height greater than the first preset height.

Alternatively or additionally, the ECU 72 may be programmed to shorten the actuator 36, 38 in response to a proximity of the key fob to the vehicle 32, as detected by the key-fob proximity sensor 82. In particular, the ECU 72 may be programmed to shorten the actuator 36, 38 in response to a distance of the key fob to the key-fob proximity sensor 82 decreasing from above a distance threshold to below the distance threshold. The distance threshold may be chosen based on making a time to walk the distance threshold to the vehicle 32 slightly longer than a length of time to shorten the actuator 36, 38, or the distance threshold may be chosen to correspond to a maximum range of the key-fob proximity sensor 82. The suspension system 30 may thus bring the cab 46 closer to the ground when an operator is likely to be entering the cab 46 soon. The key-fob proximity sensor 82 may be any sensor suitable for sensing a signal from a key fob within a short range of the vehicle 32, e.g., one or more antennas for detecting radio pulses from the key fob.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A suspension system comprising:
    a leaf spring;
    a first actuator attached to the leaf spring;
    a second actuator attached to the leaf spring;
    an axle mount attached to the first actuator and the second actuator;
    a first bottom plate directly attached to the first actuator and to the axle mount;
    a second bottom plate directly connected to the second actuator and the axle mount; and
    wherein the first actuator and the second actuator are disposed vertically between the leaf spring and the axle mount and are actuatable to change a distance between the leaf spring and the axle mount.

2. The suspension system of claim 1, further comprising a top plate disposed between the leaf spring and the first actuator.

3. The suspension system of claim 2, wherein the top plate is directly attached to the leaf spring and to the first actuator.

4. The suspension system of claim 2, further comprising a U-bolt holding the top plate and the leaf spring together.

5. The suspension system of claim 1, wherein the first actuator and the second actuator are oriented to actuate parallel to each other.

6. The suspension system of claim 1, wherein the axle mount includes a top axle-mount section and a bottom axle-mount section, and the first and second bottom plates are directly attached to the top axle-mount section.

7. The suspension system of claim 6, wherein the first and second bottom plates and the top axle-mount section are integral.

8. The suspension system of claim 1, wherein the first bottom plate and the second bottom plate are horizontally aligned.

9. The suspension system of claim 1, wherein the axle mount is between the first actuator and the second actuator.

10. The suspension system of claim 1, wherein the first actuator is a linear actuator.

11. The suspension system of claim 10, wherein the first actuator is oriented to actuate vertically.

12. The suspension system of claim 1, wherein the first actuator is electronically actuatable.

13. The suspension system of claim 12, further comprising a ride-height sensor coupled to the axle mount, and an electronic control unit communicatively coupled to the first actuator and the ride-height sensor, wherein the electronic control unit is programmed to actuate the first actuator based on data from the ride-height sensor.

14. The suspension system of claim 13, wherein the electronic control unit is programmed to lengthen the first actuator in response to data from the ride-height sensor indicating a decrease in ride height, and to shorten the first actuator in response to data from the ride-height sensor indicating an increase in ride height.

15. The suspension system of claim 12, further comprising an electronic control unit communicatively coupled to the first actuator, wherein the electronic control unit is programmed to shorten the first actuator in response to an ignition switching to off.

16. The suspension system of claim 12, further comprising an electronic control unit communicatively coupled to the first actuator, wherein the electronic control unit is programmed to shorten the first actuator in response to a proximity of a key fob to a vehicle including the suspension system.

17. The suspension system of claim 1, wherein the leaf spring is elongated along an axis, and the first actuator is closer to a center of the leaf spring than to either end of the leaf spring along the axis.

18. A suspension system comprising:
a leaf spring;
a first actuator attached to the leaf spring;
a second actuator attached to the leaf spring;
a top plate disposed between the first actuator and the leaf spring and between the second actuator and the leaf spring;
a U-bolt holding the top plate and the leaf spring together; and
an axle mount attached to the first actuator and the second actuator;
wherein the first actuator and the second actuator are disposed vertically between the leaf spring and the axle mount and are actuatable to change a distance between the leaf spring and the axle mount.

19. The suspension system of claim 18, wherein the U-bolt is disposed laterally between the first actuator and the second actuator.

20. The suspension system of claim 18, wherein the top plate is directly attached to the leaf spring, to the first actuator, and to the second actuator.

\* \* \* \* \*